Feb. 24, 1948.    P. C. SMITH ET AL    2,436,675
CONTROL GRID ADJUSTING METHOD AND APPARATUS
Filed Jan. 13, 1945    2 Sheets-Sheet 1
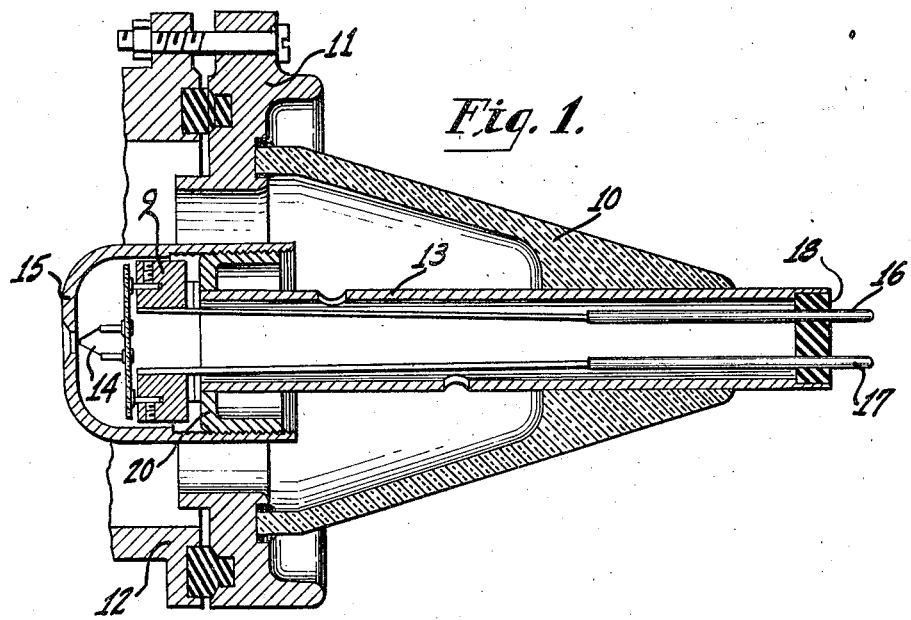
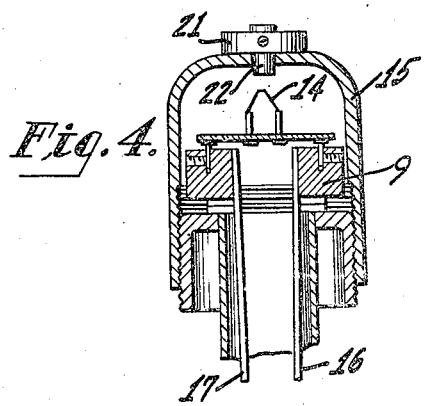
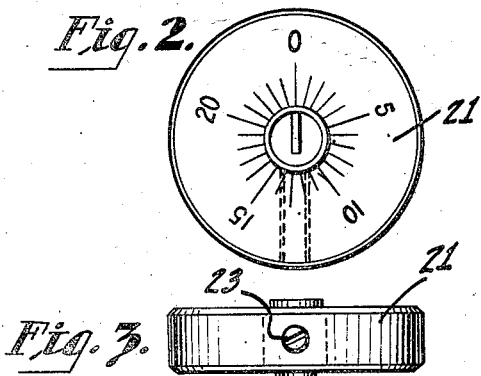
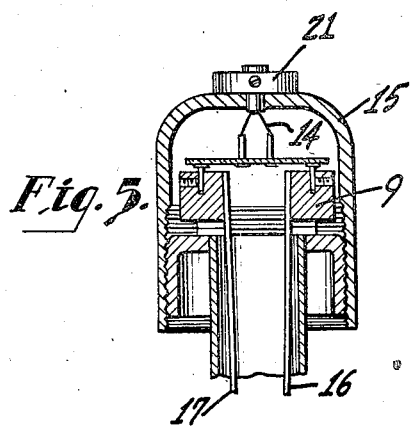
INVENTORS
PERRY C. SMITH
& FRANK E. RUNGE
BY
ATTORNEY

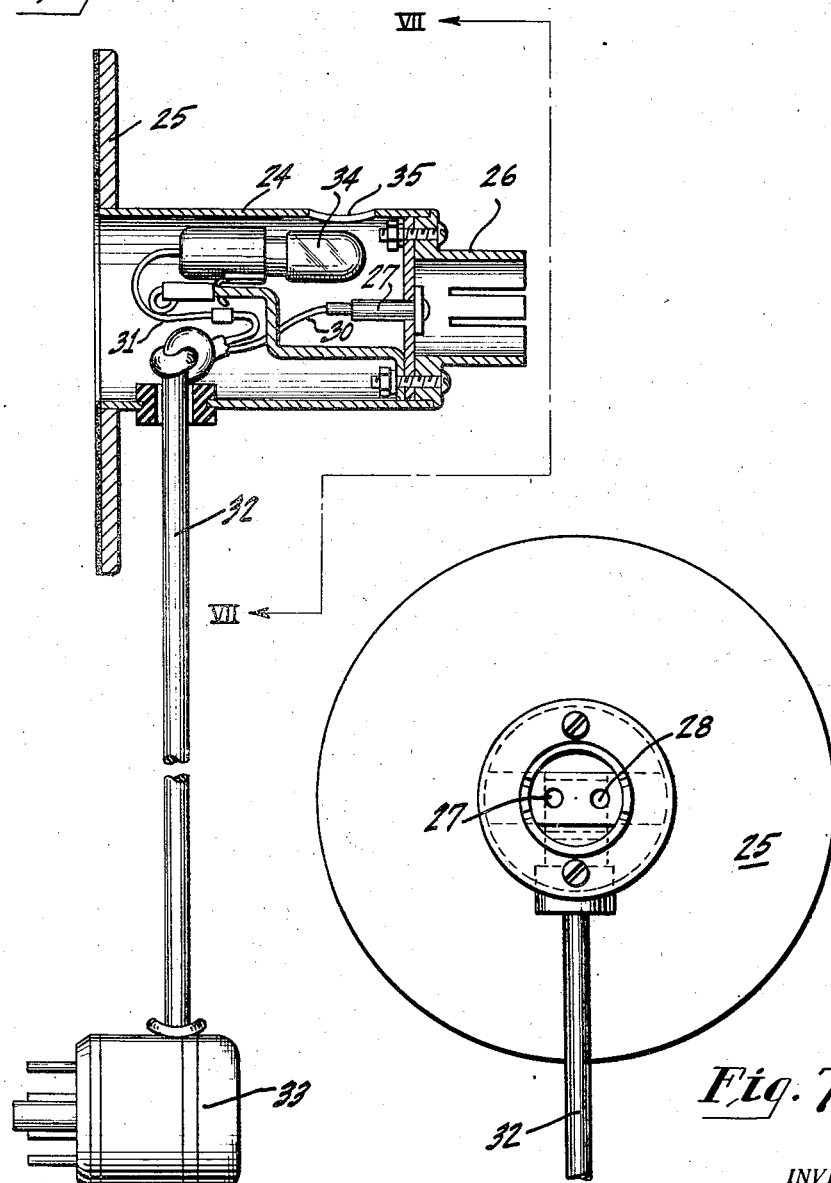

Patented Feb. 24, 1948

2,436,675

UNITED STATES PATENT OFFICE 2,436,675

CONTROL GRID ADJUSTING METHOD AND APPARATUS

Perry C. Smith, Moorestown, and Frank E. Runge, Haddon Heights, N. J., assignors to Radio Corporation of America, a corporation of Delaware Application January 13, 1945, Serial No. 572,674

7 Claims. (Cl. 250—141)

The present invention relates to cathode ray tubes and more particularly to a method and apparatus for positioning the control grid with respect to the cathode of such a tube or electron gun to ensure the maximum efficiency of the tube or gun.

Some of the objects of the present invention are: to provide a simple and efficient method of presetting the control grid of a cathode ray tube with respect to the cathode; to provide a novel apparatus for presetting the control grid of a cathode ray tube with respect to the cathode; to provide a novel gauge for presetting the control grid of a cathode ray tube; to provide a gauge operating in association with an apparatus which functions to indicate when the gauge has located the control grid in its position with respect to a cathode electrode for maximum efficiency; and to provide other improvements as will hereinafter appear.

In the accompanying drawings, Fig. 1 represents a longitudinal section of an electron gun assembly showing the parts to be adjusted in accordance with the present invention; Fig. 2 represents a plan of a depth gauge embodying one form of the present invention; Fig. 3 represents a side elevation of the gauge; Fig. 4 represents a fragmental section of the cathode end of the gun showing the grid in unadjusted position and with the gauge in position for adjustment; Fig. 5 represents the same fragmental section with the parts in adjusted position; Fig. 6 represents an indicator assembly in part section by which adjustment is determined; and Fig. 7 represents an end plan of the indicator assembly.

Referring to the drawings, one form of apparatus of the present invention is shown and by which the method of the invention is carried out. As shown, the apparatus is that of an electron gun assembly including a housing 10, mounted as a part of a base collar 11 which is arranged to be attached, in this instance, to the object or specimen end of an electron microscope column 12. The parts are arranged as usual comprising the gun tube 13, cathode electrode 9, cathode filament 14, control grid 15, and conductors 16 and 17 insulated from the tube 13 and extending exterior thereof by way of a glass seal 18. The control grid 15 is in the form of a cap to receive the cathode electrode in spaced insulated relation and has threaded engagement with an annulus 20 carried by the tube 13, so that the apertured end of the grid 15 can be adjusted to provide the required gap with respect to the filament 14. This gap between the grid and cathode is relatively critical and one of the present objects is to secure accurate presetting thereof.

For the purpose of determining the exact axial gap relation between the grid 15 and the filament 14 to accurately fix the gap therebetween, a depth gauge of conducting material is provided having a head 21 and an internally threaded bore therethrough into which the gauge sensing element 22 is screwed to leave a portion thereof projecting a predetermined distance as determined by the gap for maximum operating efficiency. The upper face of the head 21 is graduated about the bore so that by feeding the sensing element outwardly to a selected graduation the amount the element projects from the head 21 is equal to the thickness of the end wall of the grid plus the width of the selected gap. When so set the adjustment may be locked by means of a set screw 23 which enters the side of the head 21 and locks the element in the selected depth detecting position. The sensing element 22 is dimensioned to pass through the aperture of the grid and when the head 21 seats on the end of the grid the length of the part of the element within the grid is equal to the desired gap and hence, when this element contacts the filament 14, the end of the grid is spaced from the filament at the proper distance for maximum operating efficiency of the tube or gun. It should be noted when the gauge is in place that the sensing element forms one terminal of an electric circuit of which the filament 14 is the other terminal.

For indicating when the grid has been adjusted to produce the proper gap between the grid and the cathode filament, a tubular adapter 24 is arranged for vertical positioning upon a horizontal base 25, and mounts a socket 26 to receive and seat the end of the gun tube 13 and bring the contact pin ends of the conductors 16 and 17 respectively into contact with the fixed terminals 27 and 28 in the base of the socket 26. Either terminal 27 or 28 can be selected for closing the filament circuit, but as shown, a conductor 30 leads to the terminal 27 while a second conductor 31 forms with the conductor 30 a cable leading to a plug 33 for connection to a suitable source of voltage. The conductor 31 leads to an indicating lamp 34, which latter is grounded to the shell 24, and located opposite a sight opening 35 at a convenient location in the wall of the adapter 24.

In operation, the tube or gun, which is to be adjusted for maximum efficiency, has its input end placed in the socket 26 of the adapter 24 so that the pin ends of the respective conductors 16 and 17 contact the terminals 27 and 28. The cable 32 is now connected to a source of voltage whereby the grid 15 and filament 14 become terminals of an open circuit. With the sensing element 22 adjusted for the desired gap, the gauge is seated upon the grid 15 with the sensing element protruding internally of the grid and juxtaposed with respect to the filament 14. The gap between the sensing element 22 and the filament 14 is now varied by adjusting the grid relative to the cathode until the element 22 comes into contact with the filament 14, whereupon the indicating lamp 34 is illuminated, because the circuit is closed through terminal 27, conductor 30, voltage source 33, conductor 31, lamp 34, shell 24, sleeve 13, grid 15 and gauge 22. The tube or gun is now removed from the adapter, the depth gauge taken off and the tube or gun is ready for use, since the grid and filament are accurately preset for maximum operating efficiency.

From the foregoing it will be seen that the method comprises mounting a grid on the cathode for movement towards the cathode filament, inserting a depth gauge through the aperture in the grid to cause its sensing element to project a predetermined distance internally of the grid into juxtaposed relation to the filament, connecting the element and filament as terminals of an electric circuit, simultaneously moving the grid and sensing element towards the filament until the element contacts the filament, indicating this contact position, and removing the depth gauge.

We claim as our invention:

1. In a cathode ray tube of the type having a grid provided with an aperture and a cathode having a filament alined with said aperture, the method of adjusting said grid aperture with respect to said filament, which comprises mounting said grid on said cathode for movement towards said filament, inserting a depth gauge sensing element through said grid aperture to project a predetermined distance towards said filament, connecting said element and said filament as terminals respectively of an electrical circuit, varying the gap between said element and filament until said element contacts said filament to close said circuit, and indicating the closing of said circuit.

2. In a cathode ray tube of the type having a grid provided with an aperture and a cathode having a filament alined with said aperture, the method of adjusting said grid aperture with respect to said filament, which comprises mounting said grid on said cathode for movement towards said filament, inserting a depth gauge sensing element through said grid aperture to project a predetermined distance towards said filament, connecting said element and said filament as terminals respectively of an electrical circuit, varying the gap between said element and filament until said element contacts said filament to close said circuit, indicating the closing of said circuit, and removing said gauge.

3. In a cathode ray tube of the type having a grid provided with an aperture and a cathode having a filament alined with said aperture, the method of adjusting said grid aperture with respect to said filament, which comprises mounting said grid on said cathode for movement towards said filament, inserting a depth gauge sensing element through said grid aperture to project a predetermined distance towards said filament, connecting said element and said filament as terminals respectively of an electrical circuit, moving said grid and element to bring said element into contact with said filament to close said circuit, and indicating the closing of said circuit.

4. In a cathode ray tube of the type having a grid provided with an aperture and a cathode having a filament alined with said aperture, the method of adjusting said grid aperture with respect to said filament, which comprises mounting said grid on said cathode for movement towards said filament, inserting a depth gauge sensing element through said grid aperture to project a predetermined distance towards said filament, connecting said element and said filament as terminals respectively of an electrical circuit, moving said grid and element to bring said element into contact with said filament to close said circuit, indicating the closing of said circuit, and removing said gauge.

5. In a cathode ray tube, the combination of a cathode electrode including a filament, a grid mounted on said electrode for movement towards said electrode, said grid having an aperture juxtaposed to said filament, a depth gauge including a sensing element for association with said grid with said element projecting a predetermined distance through said aperture toward said filament, an electrical circuit having said element and filament as terminals, and means to indicate when said terminals are in contact, whereby the position of said grid is fixed for maximum operation condition.

6. A mechanism for setting the grid of a cathode ray tube in predetermined spaced relation from the cathode filament of said tube, comprising the combination of a gauge formed of a head having a bore therethrough, a sensing element axially adjustable in said bore for presetting to project through the aperture in said grid a distance corresponding to the desired spacing of said grid from the juxtaposed cathode filament for critical operation of the cathode ray tube, and an adapter comprising a source of voltage and an electrical circuit, for association with said tube, said circuit having said sensing element and said filament as terminals when said adapter is operatively connected to said tube, whereby axial adjustment of said grid causes said circuit to close when said sensing element contacts said filament to indicate said grid is in the selected operating position.

7. A mechanism for setting the grid of a cathode ray tube in predetermined spaced relation from the cathode filament of said tube, comprising the combination of a gauge formed of a head having a bore therethrough, a sensing element axially adjustable in said bore for presetting to project through the aperture in said grid a distance corresponding to the desired spacing of said grid from the juxtaposed cathode filament for critical operation of the cathode ray tube, an adapter comprising a source of voltage and an electrical circuit, for association with said tube, said circuit having said sensing element and said filament as terminals when said adapter is operatively connected to said tube, whereby axial adjustment of said grid causes said circuit to close when said sensing element contacts said filament to indicate said grid is in the selected operating position, and a scale on said head for setting said sensing element in a selected projecting position.

PERRY C. SMITH.
FRANK E. RUNGE.

REFERENCES CITED

The following references are of record in the file of this patent:

UNITED STATES PATENTS

| Number | Name | Date |
|---|---|---|
| Re. 22,378 | Bowie | Sept. 21, 1943 |
| 2,185,807 | Garbor et al. | Jan. 2, 1940 |
| 2,271,893 | Brundin et al. | Feb. 3, 1942 |